M. S. DUNKELBERGER.
DISTANT ELECTRICAL CONTROL MEANS.
APPLICATION FILED MAR. 1, 1921.
1,437,637.
Patented Dec. 5, 1922.
4 SHEETS—SHEET 1.
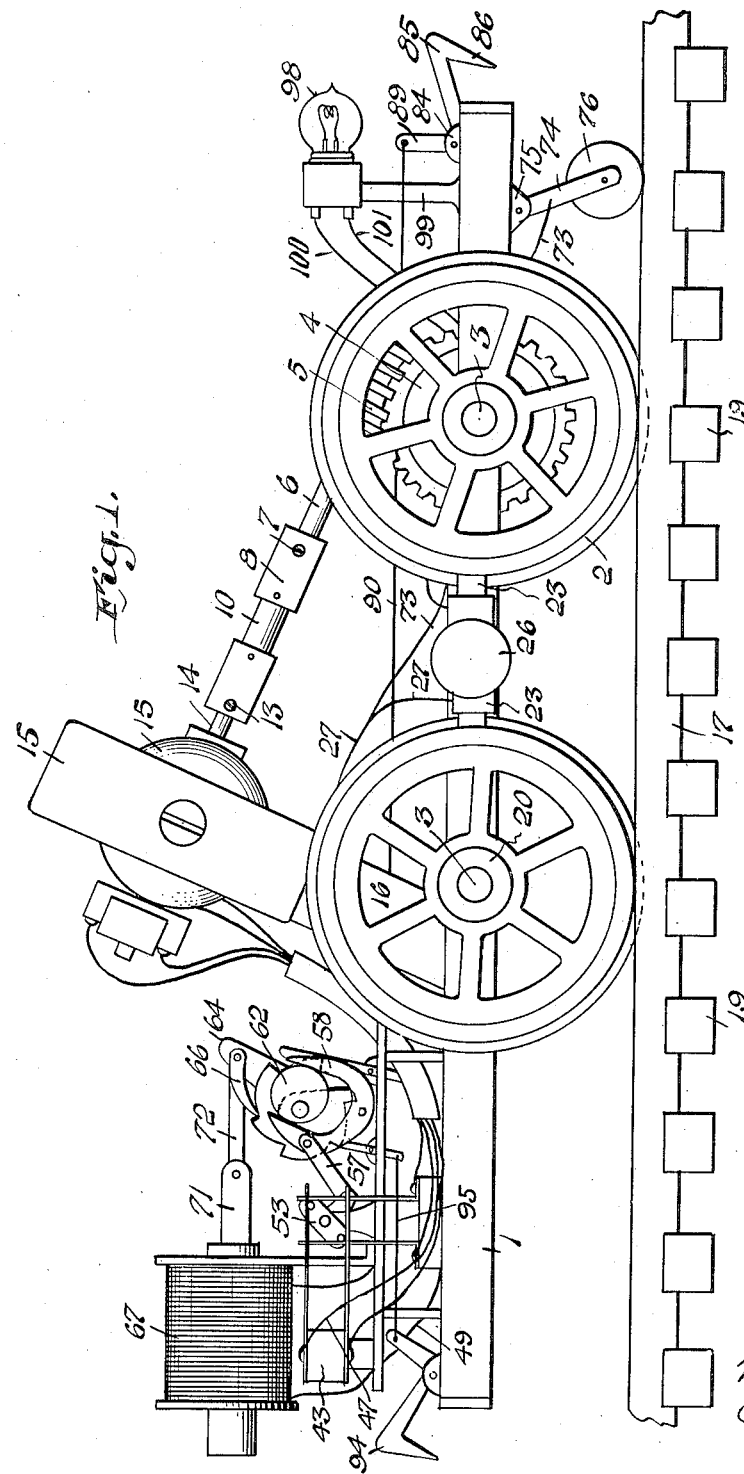
Inventor:
Milton S. Dunkelberger
Howard I. Smith
His Attorney M. S. DUNKELBERGER.
DISTANT ELECTRICAL CONTROL MEANS.
APPLICATION FILED MAR. 1, 1921.
1,437,637.
Patented Dec. 5, 1922.
4 SHEETS—SHEET 2.
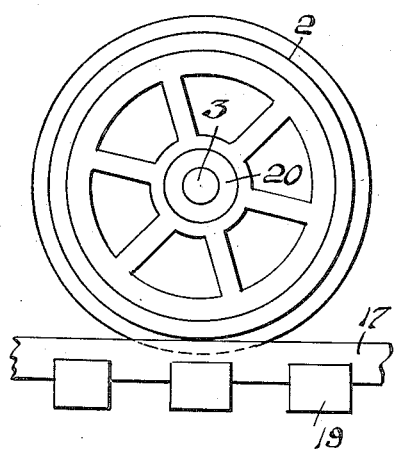
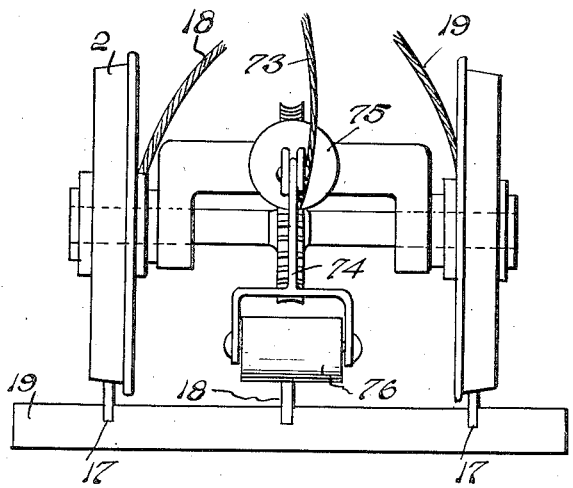
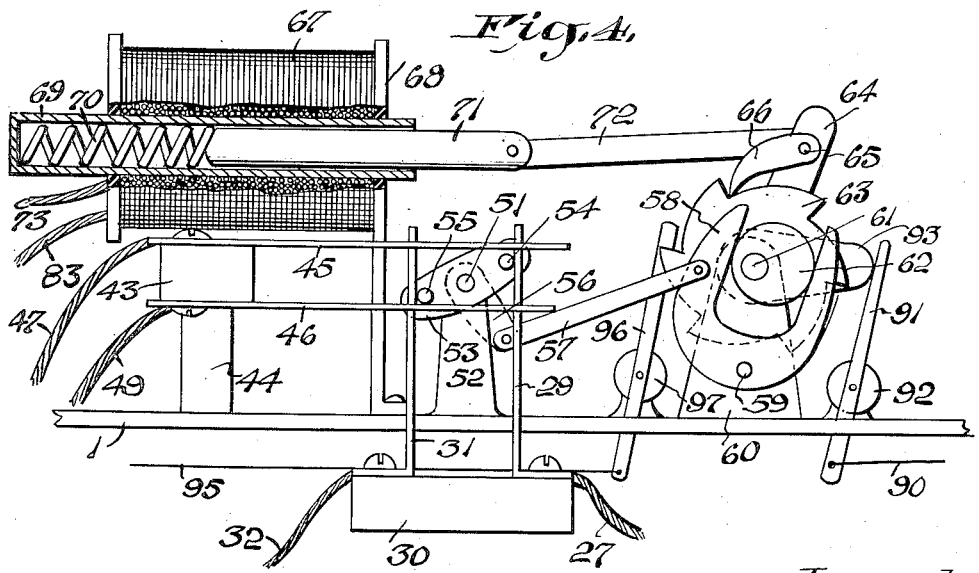
Inventor:
Milton S. Dunkelberger, M. S. DUNKELBERGER.
DISTANT ELECTRICAL CONTROL MEANS.
APPLICATION FILED MAR. 1, 1921.
1,437,637.
Patented Dec. 5, 1922.
4 SHEETS—SHEET 3.
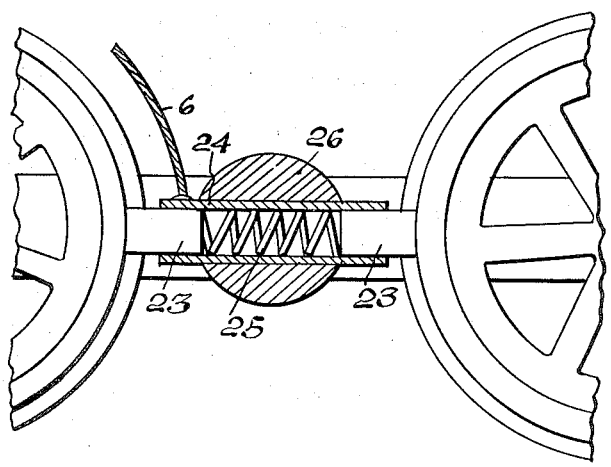
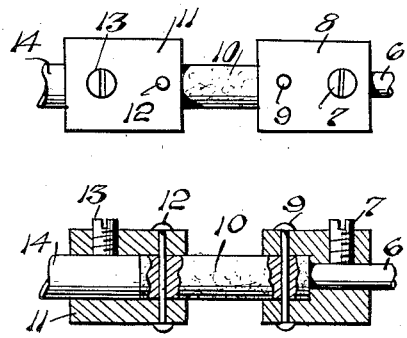
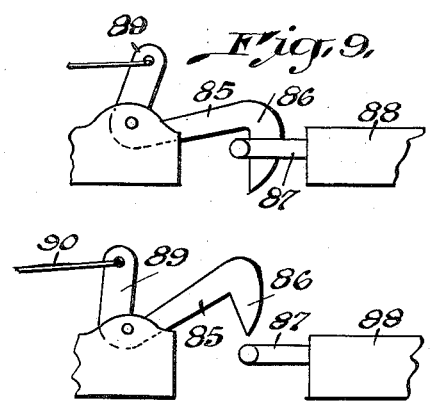
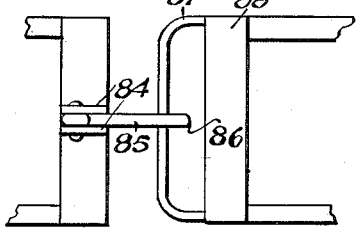

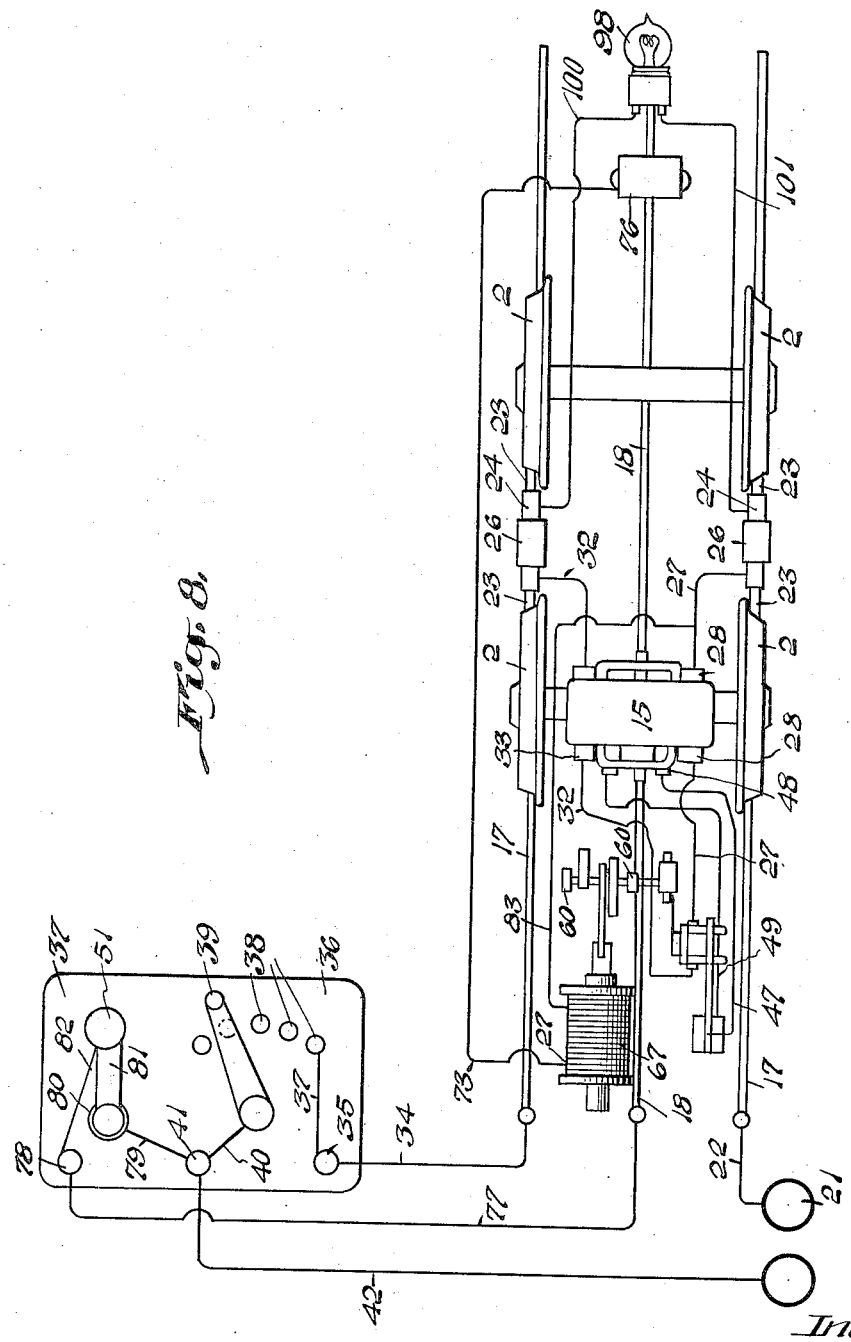

Patented Dec. 5, 1922.

1,437,637

UNITED STATES PATENT OFFICE.

MILTON S. DUNKELBERGER, OF DAYTON, OHIO.

DISTANT ELECTRICAL CONTROL MEANS.

Application filed March 1, 1921. Serial No. 448,921.

*To all whom it may concern:*

Be it known that I, MILTON S. DUNKELBERGER, a citizen of the United States, residing at Dayton, in the county of Montgomery and State of Ohio, have invented a new and useful Improvement in Distant Electrical Control Means, of which the following is a specification.

The principal object of my invention is to provide electrical means for controlling at a distance, toy and other engines, cars and trains. It is also adapted to control at a distance, lighting, coupling and other devices on those cars and engines.

On present third rail systems, it is possible to secure but one electric circuit through the rails, whereas in my invention the electric current can come in one outside rail and go out the other outside rail; or it can come in either outside rail and go out on the third rail. To secure more than one circuit through the three rails, my invention contemplates, among other things, the provision of means for insulating the wheels of the engine from the axles, to prevent a short circuit through it.

Other important and incidental objects will be brought out in the following specification, and particularly set forth in the subjoined claims.

In the accompanying drawings, Figure 1 is a side elevational view of my improved electric engine and track. Figure 2 is a side elevational view of one of the fiber-bushed wheels. Figure 3 is an end view of the track and means for receiving the electric current from the rails. Figure 4 is a side elevational view of the switch control on the engine. Figure 5 is a side elevational view of the brush contact means on one side of the engine. Figure 6 is a side view of the universal joint that connects the motor shaft to the worm shaft. Figure 7 is a plan view, partly in section, of said universal joint. Figure 8 is a wiring diagram of my improved distant control means. Figure 9 is a side elevational view of the automatic coupler in coupling position. Figure 10 is a side elevational view thereof with the hooked end of the bell-crank lever raised. And Figure 11 is a top plan view of said automatic coupler mechanism.

Throughout the specification and drawings, similar reference characters denote corresponding parts.

Referring to the accompanying drawings, the numeral 1 designates an electric engine frame which is mounted on four wheels 2. Secured to the front axle 3 is a gear 4 in mesh with a worm 5 on an inclined shaft 6 to the upper end of which is affixed by a screw 7, a collar 8. Secured in the front end of the latter below a transverse compression pin 9, is a round leather connecting piece 10 which is received by a collar 11 beneath a compression pin 12. This collar is secured by a screw 13 on a shaft 14 of a motor 15 mounted on an inclined bracket 16 supported by the frame 1. (See Figures 1, 6 and 7.) This universal joint not only permits the motor to turn the worm shaft 6 if it is out of line, but further enables the motor to be readily removed from the bracket for repair, and as readily replaced.

Referring to Figures 1, 2 and 3, the numerals 17, 17 designate the two outside rails of a track on which the wheels 2 run. These rails 17, 17, as well as a third rail 18, are mounted on wood ties 19 which insulate said rails from each other.

In order to prevent short circuits through the engine, each wheel 2 is insulated from the frame 1 by a hub bushing 20 made of a phenolic resin or other insulating product, said bushing surrounding and fixed upon the axle 2. (See Figures 1, 2 and 3.)

Referring to Figure 8, the numeral 21 designates a power line terminal from which an electric current flows to one outside rail 17 through a wire 22. This current passes through the wheels 2 on said rail, being taken from them by two carbon brushes 23, 23 that are pressed out of the ends of a brass tube 24 into engagement with said wheels, by a spring 25 (see Figure 5). The brass tube 24 is suitably secured in a transverse supporting member 26 secured to the frame 1.

Referring to Figure 8 a wire 27 leads from the carbon brushes 23, 23 to, and around, a field coil 28 of the motor 15 and thence to a contact piece 29 secured upon an insulating block 30. (See Figure 4.) Secured upon the insulating block 30 opposite the contact piece 29, which is vertical, is a vertical contact piece 31 to which is connected a wire 32 that passes around a field piece 33 on the motor 15, to a pair of carbon brushes 23, 23 mounted on the left side of the engine similarly to the first named carbon brushes 23, 23. The second pair of carbon brushes 23, 23 engage the wheels 2, 2 on the left side of the engine, to permit the current to flow through the left outside rail 17 to a wire 34 by which it is conducted to a binding post 35 on a rheostat 36. By a wire 37 the binding post 35 is connected to the outer one of a series of contacts 38 over which a connecting arm 39 moves. From the inner end of this arm a wire 40 leads to a binding post 41 to which a main line wire 42 is connected. (See Figure 8.)

For the purpose of closing the electric circuit just described, the following means are mounted on the engine frame 1. Secured to an insulating block 43 mounted on a standard 44 supported by the frame 1, are two horizontally parallel contact pieces 45 and 46 which cross the vertical planes of the contact pieces 29 and 31 a short distance from the latter. As viewed in Figure 4, these contact pieces 45, 29, 46 and 31 form with each other a rectangular figure for a purpose to be hereinafter described.

The contact piece 45 is connected by a wire 47 to an armature brush 48 on the motor 15, while the contact piece 46 is connected by a wire 49 to an armature brush 50 on the motor. (See Figures 4 and 8.)

For the purpose of directing the flow of electric current to either one of these brushes 48 and 50, to start the engine forward, or reverse it, the following means are provided. Referring to Figure 4, there is pivotally mounted on a shaft 51 journaled in a standard 52 mounted on the frame 1, a fiber rocker arm 53 on the ends of which are two outwardly projecting contact pins 54 and 55. As shown in Figure 4, the rocker arm 53 is in a position to bring the pin 54 into engagement with the ends of the contact pieces 29 and 45, and the pin 55 into engagement with the contact pieces 31 and 46. This will cause the electric current delivered to the contact piece 29 to flow through the wire 47 to the armature brush 48 and out through the armature brush 50 to start the engine forwardly. Now, when the rocker arm 53 is moved to a horizontal position, no current will flow to the armature brushes to operate the motor 15, since in this instance the contact pins 54 and 55 will only engage the contact pieces 29 and 31 respectively. On the other hand, when the rocker arm 53 is moved to its other extreme position, the contact pin 54 will engage both the contact pieces 29 and 46, and the contact pin 55 will engage both the contact pieces 31 and 45, to cause the current to flow through the wire 49 to the armature brush 50 to reverse the motion of the engine.

For the purpose of turning the rocker arm 53 to its various positions from a distance, the following means are provided. Referring again to Figure 4, there is mounted on the shaft 51 a crank arm 56 which is connected by a link 57 to one end of a yoke 58 mounted on a shaft 59 journaled in standards 60, 60 supported by the frame 1. Also journaled in said standards is a shaft 61 on which is fast an eccentric 62 that turns within the yoke 58. Also fast on the shaft 61 is a ratchet 63 having six teeth. Loosely mounted on the shaft 61 is one end of an arm 64 to one side of the free end of which, there is secured by a pivot pin 65, a pawl 66 whose nose portion is adapted to engage the teeth on the ratchet 63 to turn it.

The arm 64 is reciprocated to turn the ratchet 63, by the following means. Again referring to Figure 4, the numeral 67 designates a solenoid secured to a standard 68 that is mounted on the frame 1. Projecting through the middle portion of this solenoid 67 is a tube 69 closed at its rear end. Movable into this tube 67 against the compression of a spring 70 is a plunger 71 whose front end is connected, by means of a connecting rod 72, to the arm 64.

Referring to Figures 3 and 8, the solenoid 67 is connected, by means of a wire 73, to a forked bearing 74 pivotally secured at its upper end to a fiber stud 75 on the frame 1. Loosely mounted in the forked portion of the bearing 74 is a wheel 76 which travels over the third rail 18. The latter is connected by a wire 77 with a binding post 78. A wire 79 leads from the binding post 41 to a contact 80. The numeral 81 designates a switch arm whose rear end is connected by a wire 82 with the binding post 78. It will now be seen that by pressing the free end of the switch arm 81 into engagement with the contact 80, an electric circuit will be closed through the solenoid 67, since the latter is connected by a wire 83 with the lead wire 27.

When an electric circuit is closed through the solenoid 67 by pressing the free end of the switch arm 81 into engagement with the contact 80, the plunger 71 will be pulled into the solenoid to cause the pawl 66 to turn the ratchet 63 one tooth. Now when the free end of the switch arm is permitted to disengage the contact 80, the spring 70 will return the plunger to its original position. Each time the ratchet 8 is turned one tooth, it moves the eccentric 62 within the yoke 58. Now when the switch arm 81 has been depressed six successive times, the eccentric will have been turned far enough within the yoke 58 to cause the latter to move the rocker arm 53 from one extreme position to the other, to change the direction of rotation of the motor when the rheostat circuit is again closed. It is thus seen that from any distant point where the switch 81 and rheostat 36 are located, the engine may be stopped and moved in a reverse direction by the means above described.

Referring to Figures 1, 9, 10 and 11, there is pivotally secured between a pair of ears 84, 84 on the front end of the frame 1, a bell-crank shaped coupling member 85 having a hook-shaped front end 86 adapted to drop over a coupling rail 87 on a car 88. The coupling member 85 has a rounded head portion which, when it is forced against the rail 87, will be raised above it a sufficient distance to drop over it when said rail is further moved toward the engine. (See Figures 9 and 10.)

Secured to the rear end 89 of the coupling member 85 is a wire 90 or other flexible element which is secured to the lower end of a lever 91 pivotally secured to a bracket 92 mounted on the frame 1 in front of the bracket 60. (See Figure 4.) Fast on the shaft 61 is a cam arm 93 which, when the eccentric 62 is turned by the solenoid plunger 71 through the means described, to reverse the direction of movement of the engine, will engage the upper end of the lever 91 to cause its lower end to exert a pull on the wire 90 that will raise the hook portion of the coupling member 85 above the rail 87 on the car 88 to uncouple the engine from the latter. A similar coupling member 94 is mounted on the rear end of the engine, for operation through a wire 95 by a lever 96 secured to a bracket 97 mounted on the frame 1 in a position to permit the upper end of said lever to be engaged by the cam arm 93 when the engine is started forward after being reversed. It is thus seen that it is possible, from a distance, to couple the engine to, and uncouple it from, dumping or other cars.

Referring to Figures 1 and 8, a lamp 98 is mounted on a upright member 99 supported by the frame 1 just behind the ears 84, 84. A wire 100 leads from said lamp to a brush 23 on one side of the engine, while by a wire 101 said lamp is connected to a brush 23 on the other side of the machine. The electric lamp is thus placed in circuit with the two outside rails so that it will be illuminated when the current is going in one outside rail and out the other outside rail. The lamp can also be illuminated when the rocker arm 53 is in a neutral position, since the current can still pass from the outside rails, through the brushes 23, 23 and the wires 100 and 101 to the lamp. This permits the lamp to remain lighted when the engine is standing still, as at a station or on a siding.

My insulated wheels and track make it possible to run an engine or car in one direction on only two rails, while at present it takes three rails, or two rails and a trolley, to operate an electrically driven rail vehicle. This is due to the fact that my insulated wheels and track prevent the wheels from short circuiting through their axles.

Having described my invention, I claim:

1. In an apparatus of the type described, the combination with three rails insulated from each other, of an electrically driven device adapted to travel on two of said rails, an electric motor for driving said device, means for placing said motor in circuit with the two rails on which said device travels, reversing means for said motor, and means for placing said reversing means in circuit with one of the rails on which the device travels, and the third rail.

2. In an apparatus of the type described, the combination with three rails insulated from each other, of an electrically driven device adapted to travel on two of said rails, an electric motor for driving said device, means for placing said motor in circuit with the two rails on which said device travels, cam mechanism for reversing the current in said circuit through the motor armature, magnetic means for operating said cam mechanism, and means for placing said magnetic means in circuit with one of the rails on which the device travels, and the third rail.

3. In an apparatus of the type described, the combination with three rails insulated from each other, of an electrically driven device adapted to travel on two of said rails, an electric motor for driving said device, means for placing said motor in circuit with the two rails on which said device travels, a rocker contact arm for reversing the direction of flow of the current in said circuit to the armature of said motor, a yoke for rocking said arm, an eccentric within said yoke, magnetic means for turning said eccentric to move said yoke to change the position of the contact arm, and means for placing said magnetic means in circuit with one of the rails on which the device travels, and the third rail.

4. In an apparatus of the type described, the combination with three rails insulated from each other, of an electrically driven device adapted to travel on two of said rails, an electric motor for driving said device, means for placing said motor in circuit with the two rails on which said device travels, a rocker contact arm for reversing the direction of flow of the current in said circuit to the armature of said motor, ratchet means for turning said arm, a solenoid for operating said ratchet means, and means for placing said solenoid in circuit with one of the rails on which the device travels, and the third rail.

5. In an apparatus of the type described, the combination with three rails insulated from each other, of an electrically driven device adapted to travel on two of said rails, an electric motor for driving said device, means for placing said motor in circuit with the two rails on which said device travels, reversing means for said motor, means for placing said reversing means in circuit with one of the rails on which the device travels, and the third rail, and distant control means for closing the circuit through the two rails on which the device travels, or through one of said rails and the third rail, for the purpose specified.

6. In an apparatus of the type described, the combination with three rails insulated from each other, of an electrically driven device adapted to travel on two of said rails, an electric motor for driving said device, means for placing said motor in circuit with the two rails on which said device travels, reversing means for said motor, means for placing said reversing means in circuit with one of the rails on which the device travels, and the third rail, and a coupling on said device controlled by said reversing means.

In testimony whereof I have hereunto set my hand this 28th day of February, 1921.

MILTON S. DUNKELBERGER.

Witness:
HOWARD S. SMITH.